(12) United States Patent
Rosenau

(10) Patent No.: US 10,125,616 B2
(45) Date of Patent: Nov. 13, 2018

(54) FAN BLADE FOR AN AIRCRAFT ENGINE

(71) Applicant: Rolls-Royce Deutschland Ltd & Co KG, Blankenfelde-Mahlow (DE)

(72) Inventor: Knut Rosenau, Herzfelde (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 245 days.

(21) Appl. No.: 15/042,384

(22) Filed: Feb. 12, 2016

(65) Prior Publication Data

US 2016/0258303 A1    Sep. 8, 2016

(30) Foreign Application Priority Data

Mar. 4, 2015   (DE) .......................... 10 2015 203 868

(51) Int. Cl.
*F01D 5/28* (2006.01)
*F01D 5/16* (2006.01)
(Continued)

(52) U.S. Cl.
CPC ................. *F01D 5/28* (2013.01); *F01D 5/16* (2013.01); *F01D 5/282* (2013.01); *F01D 5/34* (2013.01); *F04D 29/023* (2013.01); *F04D 29/324* (2013.01); *F04D 29/325* (2013.01); *F04D 29/388* (2013.01); *F04D 29/668* (2013.01); *F05D 2220/36* (2013.01); *F05D 2230/20* (2013.01); *F05D 2230/25* (2013.01); *F05D 2230/90* (2013.01); *F05D 2240/306* (2013.01);
(Continued)

(58) Field of Classification Search
CPC ... F01D 5/16; F01D 5/28; F01D 5/282; F01D 5/34; F04D 29/023; F04D 29/324; F04D 29/325; F04D 29/388; F04D 29/668; F05D 2220/36; F05D 2230/20; F05D 2230/25; F05D 2230/90; F05D 2240/306; F05D 2300/43; F05D 2300/501; F05D 2300/522; F05D 2300/615; Y02T 50/672; Y02T 50/673
See application file for complete search history.

(56) References Cited

U.S. PATENT DOCUMENTS 2,431,184 A * 11/1947 Erle ..................... B64C 11/205
                                                            416/224
3,132,841 A    5/1964 Wilder et al.
(Continued)

FOREIGN PATENT DOCUMENTS

| DE | 60008980 T2 | 3/2005 |
|---|---|---|
| DE | 102006046070 A1 | 4/2007 |
| EP | 2458153 A2 | 5/2012 |

OTHER PUBLICATIONS

European Search Report dated Aug. 16, 2016 for counterpart European Application No. 16155260.9.
(Continued)

*Primary Examiner* — William McCallister
(74) *Attorney, Agent, or Firm* — Shuttleworth & Ingersoll, PLC; Timothy J. Klima

(57) ABSTRACT

A fan blade for an aircraft engine, including a leading edge, a trailing edge, a suction side, a pressure side and a blade tip, is provided. The fan blade has a large-area elastomer layer which takes up at least 20% of the surface of the suction side of the fan blade.

21 Claims, 9 Drawing Sheets

(51) Int. Cl.
*F01D 5/34* (2006.01)
*F04D 29/66* (2006.01)
*F04D 29/32* (2006.01)
*F04D 29/38* (2006.01)
*F04D 29/02* (2006.01)

(52) U.S. Cl.
CPC .... *F05D 2300/43* (2013.01); *F05D 2300/501* (2013.01); *F05D 2300/522* (2013.01); *F05D 2300/615* (2013.01); *Y02T 50/672* (2013.01); *Y02T 50/673* (2013.01)

(56) References Cited

U.S. PATENT DOCUMENTS

| | | | | |
|---|---|---|---|---|
| 3,357,850 | A * | 12/1967 | Baker | F01D 5/16 188/268 |
| 3,368,795 | A * | 2/1968 | Bolin | F01D 5/16 29/889.71 |
| 3,758,233 | A * | 9/1973 | Cross | C23C 4/02 416/229 A |
| 3,796,513 | A * | 3/1974 | Jonas | F01D 5/16 416/224 |
| 4,097,193 | A | 6/1978 | Brunsch et al. | |
| 4,118,147 | A * | 10/1978 | Ellis | B23P 6/005 416/224 |
| 4,895,491 | A | 1/1990 | Cross et al. | |
| 5,108,262 | A * | 4/1992 | Crane | B64C 11/20 416/224 |
| 5,655,883 | A | 8/1997 | Schilling | |
| 5,720,597 | A | 2/1998 | Wang et al. | |
| 5,839,882 | A | 11/1998 | Finn et al. | |
| 5,879,753 | A * | 3/1999 | Zajchowski | C23C 4/02 427/446 |
| 5,913,661 | A | 6/1999 | Panovsky et al. | |
| 5,931,641 | A * | 8/1999 | Finn | F01D 5/147 416/229 A |
| 6,033,186 | A | 3/2000 | Schilling et al. | |
| 6,039,542 | A | 3/2000 | Schilling et al. | |
| 6,059,533 | A * | 5/2000 | Stoker | C23C 4/02 415/119 |
| 6,102,664 | A | 8/2000 | Nguyen | |
| 6,282,786 | B1 | 9/2001 | Evans et al. | |
| 6,287,080 | B1 | 9/2001 | Evans et al. | |
| 6,364,616 | B1 | 4/2002 | Stevenson et al. | |
| 6,454,536 | B1 | 9/2002 | Evans et al. | |
| 6,454,636 | B1 | 9/2002 | Iwabuchi | |
| 6,544,002 | B1 | 4/2003 | Evans et al. | |
| 7,360,997 | B2 | 4/2008 | Wagner et al. | |
| 8,061,997 | B2 * | 11/2011 | Le Hong | F01D 5/147 416/205 |
| 8,500,410 | B2 | 8/2013 | De Moura et al. | |
| 2004/0018091 | A1 | 1/2004 | Rongong et al. | |
| 2004/0184921 | A1 | 9/2004 | Schreiber | |
| 2007/0065291 | A1 | 3/2007 | Karafillis | |
| 2009/0057488 | A1 | 3/2009 | Goldfinch et al. | |
| 2010/0104446 | A1 | 4/2010 | Vehr et al. | |
| 2014/0072427 | A1 | 3/2014 | Weisse et al. | |

OTHER PUBLICATIONS

German Search Report dated Oct. 15, 2015 from counterpart German Application No. 10 2015 203 868.8.

* cited by examiner

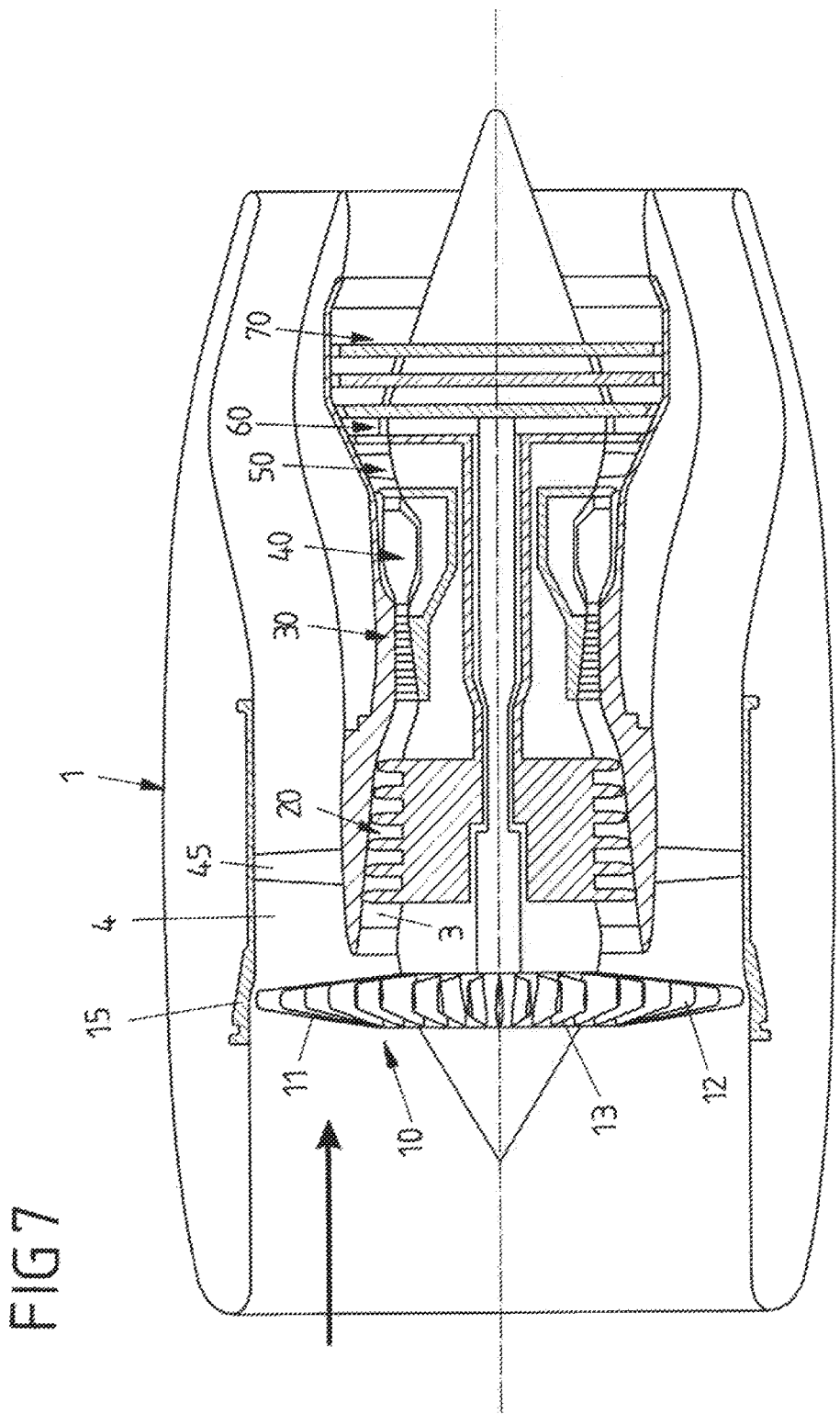

FAN BLADE FOR AN AIRCRAFT ENGINE

REFERENCE TO RELATED APPLICATION

This application claims priority to German Patent Application No. 10 2015 203 868.8 filed on Mar. 4, 2015, the entirety of which is incorporated by reference herein.

BACKGROUND

This invention relates to a fan blade for an aircraft engine.

Aircraft engines must be able to withstand a fan blade loss. A fan blade loss occurs when a blade of a fan breaks and blade segments separate, which can lead to considerable damage to the engine and to the entire aircraft. In the event of a fan blade loss of all-metal fan blades in particular, the mass of the lost fan blade, which lies proportionately far to the outside radially, causes high impact forces into the fan casing. To compensate for that, a relatively heavy fan casing, a strong front mounting structure and a relatively heavy fan rotor are required. These cause high imbalance forces introduced into the engine suspension on the aircraft side, which in turn leads to the requirement to design the engine suspension relatively heavy and solid.

The weight and costs of the engine and the engine suspension are therefore considerably increased by the necessity to compensate for a fan blade loss.

Accordingly, there is a need to reduce the disadvantages entailed by compensating for a fan blade loss.

To do so, it is known to design fan blades not in solid metal, but in a hybrid manner, thereby reducing their weight. For example, US 2014/0072427 A1 describes the provision of a honeycomb filler inside recesses of all-metal fan blades. U.S. Pat. No. 5,913,661 A describes grooves made in a fan blade and filled with an elastomer, which serve to damp fan blade vibrations. Further hybrid structures of fan blades are described by U.S. Pat. No. 8,500,410 B2, U.S. Pat. No. 6,364,616 B1 and U.S. Pat. No. 5,655,883 A.

The solutions known in the state of the art for providing hybrid fan blades however involve some disadvantages. For example, honeycomb fillers, which according to US 2014/0072427 A1 are incorporated in suction-side recesses of fan blades, are unsuitable for damping against blade vibrations and prone to cracking when overstretched, e.g. in the event of a bird strike. Grooves made in the main body of the fan blade according to U.S. Pat. No. 5,913,661 A also harbour the risk of cracking in the event of being overstretched, e.g. from a bird strike.

SUMMARY

An object underlying the present invention is to provide a fan blade for an aircraft engine which allows a reduction of the disadvantages created by the necessity to safeguard an aircraft engine against a fan blade loss.

It is a particular object of the present invention to provide solution to the above problems by a fan blade having the features as described herein.

The solution in accordance with the invention is therefore characterized in that the fan blade has a large-area elastomer layer forming at least 20% of the surface of the suction side of the fan blade. The elastomer layer is here formed in one piece and contiguously from a solid elastomer and not provided with cavities.

The at least partial formation of the suction side of the blade with an elastomer layer has the advantage that the weight of the fan blade is reduced by the elastomer layer due to its comparatively low density, leading to a reduction in the impact load and imbalance load in the event of a fan blade loss. This applies particularly when the elastomer layer is formed in the radially outer area of the fan blade, which is the case according to an embodiment of the present invention. In this case, it is possible with the solution in accordance with the invention to achieve a reduction of up to 30% in the impact load and imbalance load in the event of a fan blade loss.

A further advantage of using a large-area elastomer layer is that the elastomer layer applied over a large area onto the fan blade acts as a vibration damper against blade vibrations, which are excited for example by engine vibrations and their multiple frequencies. The property of vibration damping is related to the fact that the elastomer layer has a lower modulus of elasticity than the remaining blade material (typically a metal or metal alloy), so that other vibration properties are provided.

A third advantage of the arrangement in accordance with the invention of an elastomer on the suction side of the fan blade is that separate application of a metal cover onto the elastomer layer, and hence the risk of cracking at the connection of that metal cover to the fan blade main body in the case of overstretching (for example due to bird strike), can be avoided. It is provided here that the elastomer is wear-resistant and accordingly is suitable for forming the suction side of the fan blade.

According to an embodiment of the present invention, it is provided that the elastomer layer covers a proportion of 20% to 80%, in particular a proportion of 30% to 50%, of the surface of the suction side of the blade. The large-area elastomer layer forms here a solid and homogeneous structure from one elastomer. The elastomer layer is not formed by individual parts separated from one another, but represents a single and contiguous structure.

The surface of the suction side of the blade to which the proportion of at least 20% relates, is regarded as that surface present on the suction side of the blade that is passed by a gas or airflow during use of the blade for its intended purpose in a fan.

According to an embodiment of the invention, the elastomer layer is provided at a distance from the leading edge and/or at a distance from the trailing edge on the suction side of the blade. In particular, there is a distance from the leading edge, since the latter must particularly withstand a bombardment with particles or objects possibly present in the gas flow and accordingly is advantageously made of metal.

A further embodiment of the invention provides that the elastomer layer is formed predominantly in that area of the blade on the suction side that makes up the radially outer half of the blade relative to the overall height of the blade. The elastomer layer is thus provided predominantly in the radially outer area of the blade. This is a particular advantage since the weight of the fan blade in the radially outer area is reduced as a result, leading to a reduction of the impact load and of the imbalance load in the event of a fan blade loss.

Particularly advantageous is the use of hybrid fan blades in accordance with the invention in engines where previously all-metal fan blades have been used and where the relatively high thickness of the outer area of the fan blade is needed to achieve a good aerodynamic profile, but does not contribute to the same extent to the strength of the all-metal fan blade. It is possible here to make weight savings particularly by the provision of a large-area elastomer layer on the suction side of the blade. It has become evident here that the complete thickness of the fan blade is not needed at the radially outer end for the blade strength and that the all-metal blade material can be substantially replaced by the elastomer layer in accordance with the invention.

It can be provided that the elastomer layer extends up to the blade tip of the blade. Since the elastomer layer stretches in the radial direction more strongly under the effect of centrifugal forces due to its lower modulus of elasticity of, for example, around 20 to 30 N/mm² in comparison with titanium with a modulus of elasticity of 105,000 N/mm², the elastomer layer on the fan blade tip opposite the metallic main body is shortened in the radial direction. This prevents the elastomer layer from radially contacting the fan casing under centrifugal force stretching and hence being damaged. Alternatively, the elastomer layer ends at a distance from the blade tip which is for example in the range between 0.5 mm and 5 cm. As a result, it can for example be avoided that the elastomer layer stretches beyond the blade tip during operation due to the centrifugal force.

According to an embodiment of the invention, the elastomer layer on the suction side is designed substantially U-shaped, where the open end of the U-shaped area ends at the blade tip or is facing the latter. According to this embodiment, the elastomer layer thus begins on the suction side in a central area and widens as the radial height increases as far as the blade tip or just in front of the blade tip.

It can be provided that the elastomer layer has, in that area of the blade in which it is arranged, a proportion of the total thickness of the blade of up to 50%, of up to 60%, of up to 70% or of up to 80%. In that area of the blade in which the elastomer layer is provided, it can thus make up a substantial proportion, of up to 80%, of the thickness of the blade. The thickness of the elastomer layer rises continuously here, preferably from radially inwards to radially outwards.

It is provided here according to an embodiment of the invention that the thickness of the elastomer layer increases outwards in the radial direction at least section by section. The thickness of the elastomer layer either continuously increases as the radial height of the blade increases, or it remains constant once it has attained a certain thickness. As a result, a large-area transition for the stiffness in the radial direction is provided that is continuous and steady, and does not include any abrupt stiffness changes as would for example occur with axially extending ribs. Here, the blade becomes increasingly soft towards the outside. This improves the property of the elastomer layer to act as a vibration damper and to counteract blade vibrations.

Due to the increase in the thickness of the elastomer layer outwards in the radial direction, a weight reduction is also achieved in addition at the radially outer end of the blade, where the blade has the highest rotational speed, and so the impact load and imbalance load are particularly reduced in the event of a fan blade loss. Consequently, the thickness of the elastomer layer, increasing outwards at least section by section, can be concomitant with a thickness decreasing outwards at least section by section or constantly of a metallic main body of the fan blade on which the elastomer layer is applied. In this way the proportion of metal in the fan blade decreases with increasing radius and the weight of the fan blade is increasingly reduced towards a radially outer area of the fan blade.

The fan blade is, according to an advantageous embodiment of the invention, designed as a one-piece all-metal blade apart from the elastomer layer. The blade consists in this case of a blade main body of metal and of the elastomer layer forming over a large area the surface of the suction side of the blade. It is furthermore provided according to an embodiment of the invention that the blade main body consists of a metal forging. A particularly high material compression can be achieved by forging which cannot be achieved with alternative methods for blade manufacture like metal-powder injection moulding or milling.

However, the invention is in no way restricted to the blade main body of the fan blade being designed as a forged blade; other manufacturing methods such as metal-powder injection moulding and milling can also be used. It is also pointed out that the blade main body in no way has to be necessarily designed in one piece and solid. It can for example alternatively be provided that the blade main body is designed as a composite blade on the basis of carbon fibers. The weight too of a composite fan blade of this type can be reduced in the outer area by an elastomer layer applied to the suction side, in order to reduce stresses in the blade root. Also, a reduction in the fan blade vibrations can equally be achieved in composite fan blades by an elastomer layer applied to the suction side due to blade damping by means of said elastomer layer.

A further embodiment of the invention provides that the blade material has a large-area recess in that area not forming the elastomer layer. In the absence of the elastomer layer, this large-area recess is provided towards the suction side of the blade. The elastomer layer is applied to this large-area recess and completes the fan blade in this way.

A large-area recess of this type can for example be incorporated into the fan blade during forging of the blade main body. According to an alternative solution, the recess is created by milling or other metal-cutting methods after manufacture of the blade main body. After the elastomer layer has been applied to the large-area recess, it can be provided that it is then milled over to provide exactly the required aerodynamic shape of the suction side.

The elastomer layer can for example be provided as an injection casting or by vulcanizing a prefabricated pad. The connection of the elastomer layer to the blade main body is achieved for example by bonding. To improve the adhesive connection, it can be provided that certain surface roughnesses of the blade main body are created in the area of the recess and/or of the elastomer layer. Additionally and/or alternatively to an adhesive connection between the elastomer layer and the blade main body, positive connections can also be provided.

The elastomer layer can generally speaking consist of any elastomer, i.e. of any shape-retaining and elastically deformable plastic. The elastomer layer is for example formed from a fluorinated hydrocarbon, for example fluorinated rubber, specifically a copolymer, where the elastomer layer is according to an embodiment applied directly to the metallic main body of the fan blade and cross-linked there, preferably peroxide cross-linked. Copolymer is distinguished particularly by its low-temperature flexibility and its shape stability under compression load. Its low-temperature flexibility makes it well-suited for low ambient temperatures, for example in winter and at high altitudes. Furthermore it affords the hybrid fan blade good resistance in the event of major elastic deformations, in particular from bird strike. The high shape stability under compression load affords the hybrid fan blade a high shape stability of the aerodynamic profile and hence high efficiency.

Alternatively, pads prefabricated by injection moulding or by vulcanization can be applied onto the all-metal main body of the fan blade by means of bonding or vulcanization. Cross-linking, vulcanization or bonding of prefabricated pads is performed in an embodiment under pressure in order to obtain a better connection to the blade main body. This can be achieved by one or more flexible or rigid mould elements, by means of which a prefabricated pad is pressed during cross-linking, vulcanization or bonding with a sufficiently high pressure, for example in the range from 50 kPa to 1000 kPa, in particular in the range from 100 kPa to 200 kPa, onto the blade main body.

The elastomer layer furthermore has a lower density than the blade main body. This applies both for the case that the blade main body is formed solidly out of metal (e.g. titanium with a density of 4.50 g/cm$^3$) and for the case that the blade main body is produced in a composite design, in which case the density is typically around 1.90 to 2.00 g/cm$^3$. In an advantageous embodiment, the density of the elastomer is lower than the density of the blade main body by at least the factor 2 or by at least the factor 4.

The material can be selected such that the elastomer layer has on its outside (forming the suction side of the fan blade) a high abrasive wear resistance. This is for example achieved by selecting an elastomer with a Shore A hardness of at least 50, preferably of at least 80.

The invention furthermore relates to a fan for a turbofan engine having a plurality of blades as described herein.

BRIEF DESCRIPTION OF THE DRAWINGS

The present invention is more fully described in the following with reference to the figures of the accompanying drawing showing several exemplary embodiments.

FIG. 7 shows a longitudinal section through a schematic representation of a turbofan engine;

DETAILED DESCRIPTION

Figure 1:
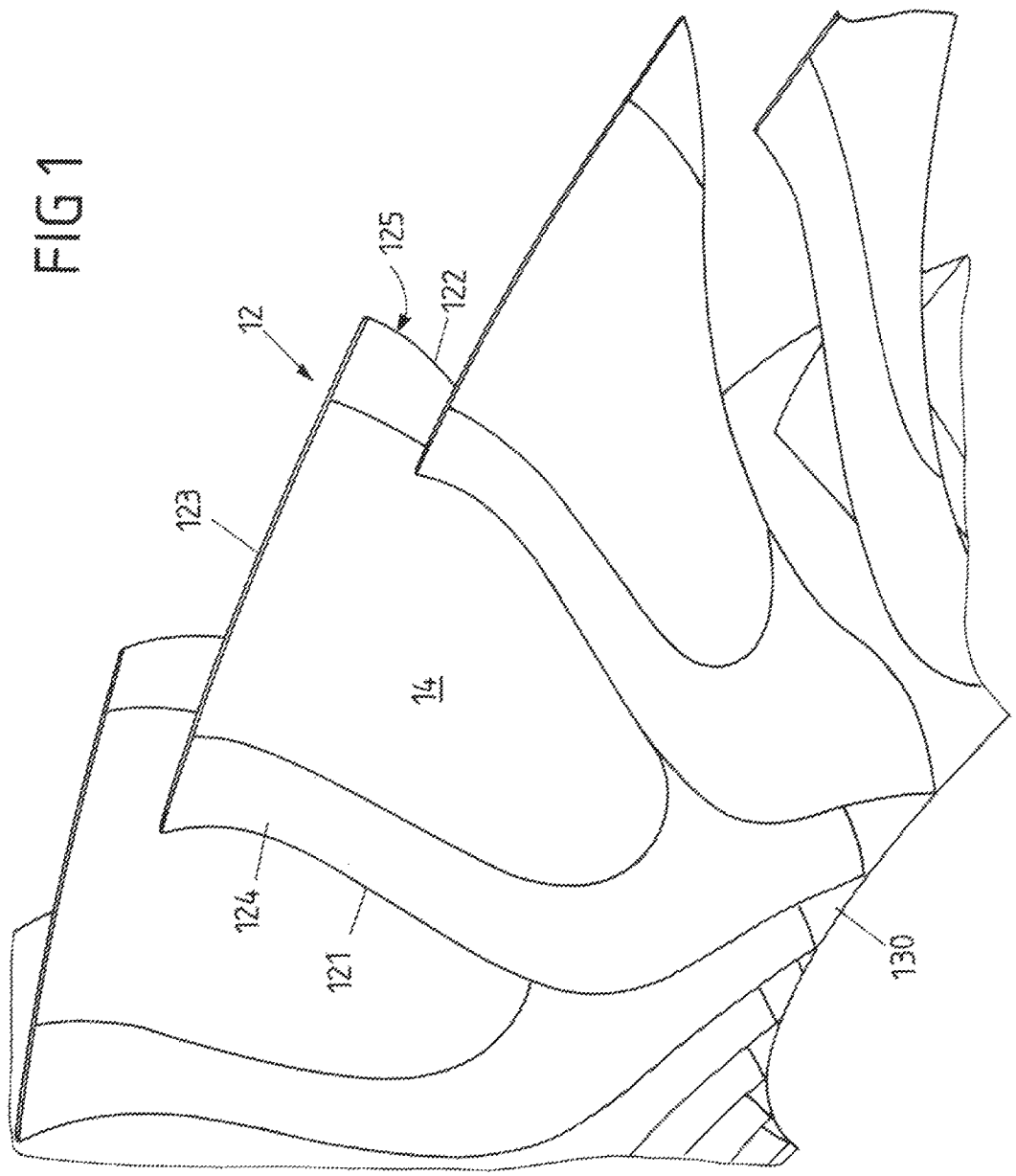
FIG. 1 shows a perspective view of a first exemplary embodiment of fan blades provided with an elastomer layer on the suction side of the fan blades.

The present invention is described in the following in respect of fan blades of a fan in a turbofan engine. The principles of the present invention apply however in the same way for the blades of a propeller. Fan blades in the meaning of the present invention also include propeller blades.

FIG. 7 schematically shows a turbofan engine 1. The turbofan engine 1 includes a low-pressure compressor 10 having a fan 11, an intermediate-pressure compressor 20, a high-pressure compressor 30, a combustion chamber 40, a high-pressure turbine 50, an intermediate-pressure turbine 60 and a low-pressure turbine 70. The intermediate-pressure compressor 20 and the high-pressure compressor 30 each have a plurality of compressor stages, where each compressor stage includes a rotor and a stator. In an alternative embodiment, the turbofan engine 1 includes a low-pressure compressor arranged in the core engine upstream of the high-pressure compressor 30.

The low-pressure compressor 10 includes a fan 11 having fan blades 12 attached to a fan disk 13. The low-pressure compressor 10 furthermore includes a fan casing 15.

In a manner known per se, the turbofan engine forms a secondary flow duct or bypass duct 4 and a primary flow duct 3 that passes through the core engine. Air is aspirated and accelerated by the fan 11, with two airflows being provided, a first airflow through the primary flow duct 3 and a second airflow through the secondary flow duct 4. Stator vanes 45 and/or struts can be arranged in the secondary flow duct 4. The high-pressure turbine 50, the intermediate-pressure turbine 60 and the low-pressure turbine 70 drive the high-pressure compressor 30, the intermediate-pressure compressor 20 and the fan 11 via a high-pressure shaft, an intermediate-pressure shaft and a low-pressure shaft respectively.

In the context of the present invention, a specific design of the fan blades 12 is provided and is explained in the following using FIGS. 1 to 6.

FIG. 1 is a perspective representation obliquely from the front onto a plurality of fan blades 12 of a fan. The fan blades 12 are in BLISK design (BLISK=Blade Integrated Disk) and are part of a so-called fan BLISK. Accordingly, they have no separate blade roots, but are connected in one piece to a disk 130 of the fan BLISK.

Each fan blade 12 includes a leading edge 121, a trailing edge 122, a blade tip 123, a suction side 124 and a pressure side 125. A separate blade root is not provided in the exemplary embodiment of FIG. 1 due to the BLISK design. As will be explained below in relation to FIG. 2, the individual fan blades 12 can however also be designed with a blade root.

According to the present invention, the fan blade 12 furthermore includes an elastomer layer 14 provided over a large area on the suction side 124 of the blade 12. A large-area arrangement of the elastomer layer 14 on the suction side of the blade 12 means here that the elastomer layer takes up at least 20% of the surface of the suction side 124 of the blade 12. This percentage is preferably higher, for example in the range between 20% and 80%, in particular in the range between 30% and 50% of the surface of the suction side of the blade 12.

The elastomer layer 14 is for example a fluorinated hydrocarbon, in particular a fluorinated rubber, which is characterized by a high abrasive wear resistance and to that extent is suitable for forming the suction side of the blade 12. The elastomer layer 14 is for example vulcanized onto the basic blade material, as will be explained below on the basis of FIG. 3.

Figure 2:
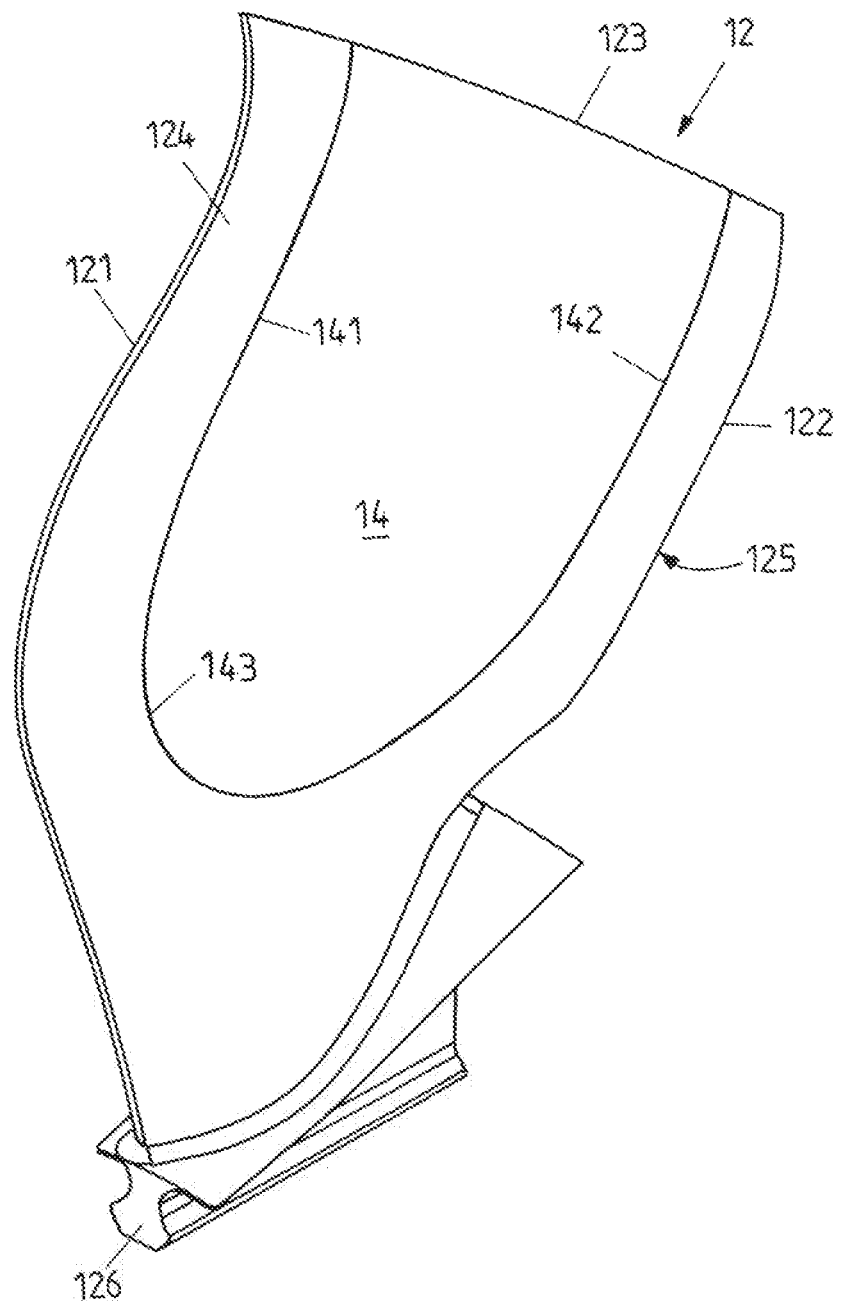
FIG. 2 shows a second exemplary embodiment of a fan blade provided with an elastomer layer on the suction side of the fan blade.

FIG. 2 shows an alternative exemplary embodiment of a fan blade 12. In the exemplary embodiment in FIG. 2, the fan blade 12 is intended for use with an insert-blade fan. Accordingly, the fan blade 12 in FIG. 2 has a blade root 126 which can be inserted into a matching disk or other structure of the fan in a manner known per se. The precise type of connection of the fan blade 12 to the fan disk 13 (cf. FIG. 7) is not important in the context of the present invention.

As regards the structure of the actual fan blade 12, the same structure applies in FIG. 2 as in the fan blade in FIG. 1. Accordingly, the fan blade 12 also includes an elastomer layer 14 arranged on the suction side 124 of the blade 12. In the following, the shape of the elastomer layer 14 is explained in more detail using FIG. 2. The explanations apply in the same way for FIG. 1, in which the elastomer layer 14 is partly covered by other fan blades.

Accordingly, the elastomer layer 14 has a shape such that it is at a distance from the leading edge 121 of the fan blade 12. Furthermore, the elastomer layer 14 is also at a distance from the trailing edge 122 of the fan blade. The elastomer layer 14 forms a U-shaped area here. It is accordingly limited by a curved area 143 adjoined in the radial direction by two sides 141, 142, which limit the elastomer layer 14 forwards and rearwards in the axial direction. The elastomer layer 14 widens in the radial direction from a low axial extent in the curved area 143 to an increasing axial extent towards the blade edge 123.

It is provided in the exemplary embodiment in FIG. 2 that the elastomer layer 14 extends up to the blade edge 123.

The blade 12 is formed by a blade main body in those areas not formed by the elastomer layer 14. This blade main body can be a one-piece solid metal forging, for example titanium. Forging of the fan blade achieves a particularly high material compression. Generally speaking, the blade main body can however also be produced in a composite design, for example as a composite fan blade of the basis of carbon fibers.

Figure 3:
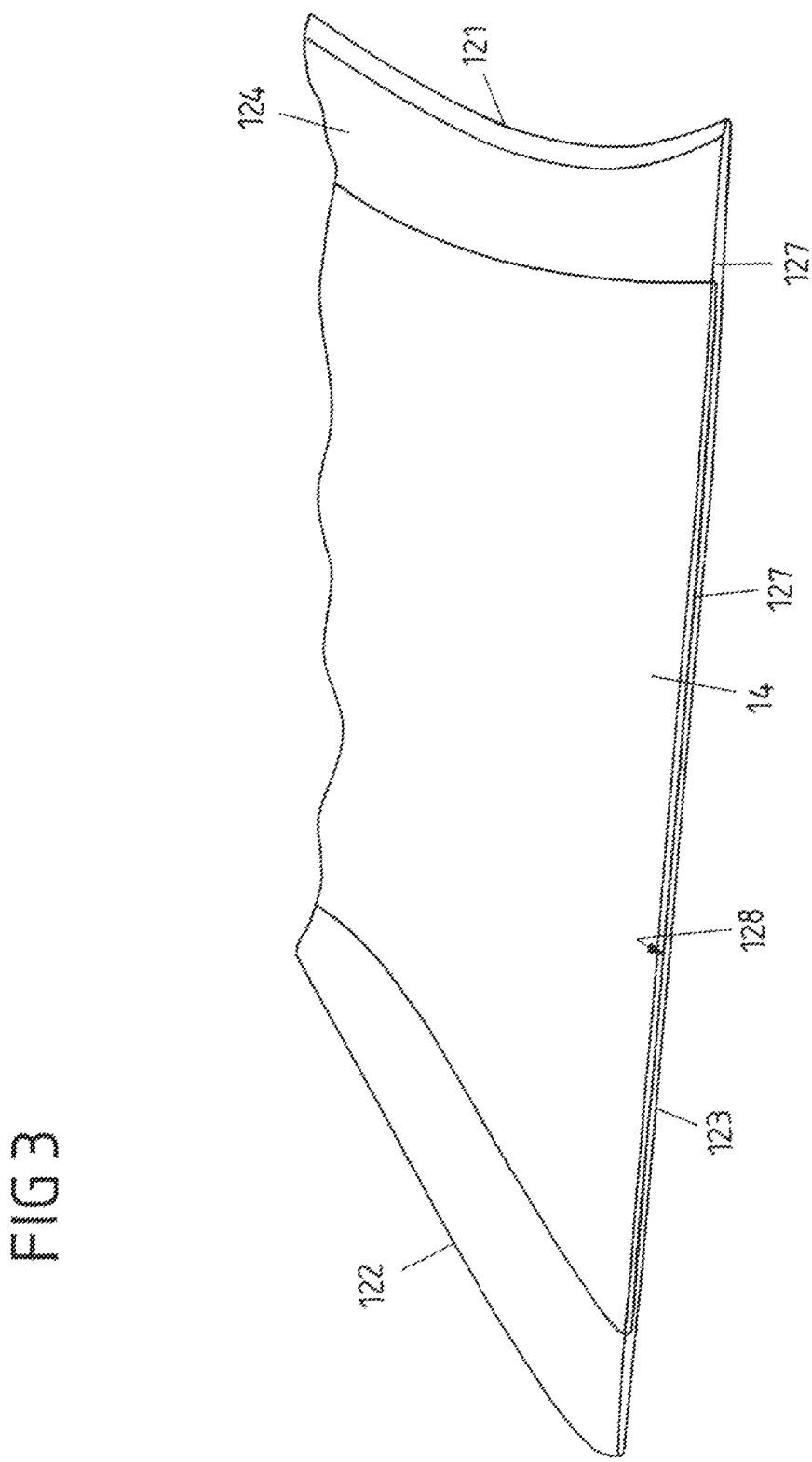
FIG. 3 shows, in perspective view, the blade tip of a fan blade in accordance with FIG. 1 or 2.

For arranging the elastomer layer 14 on the blade main body, it is provided that the blade main body has a large-area recess or flattened zone. This can be discerned in FIG. 3, showing a view from the direction of the blade tip 123. Accordingly, a large-area recess 128 is incorporated in the blade main body 127 towards the suction side 124. This recess 128 can for example be generated in the blade main body 127 during forging of the latter. According to an alternative embodiment, the recess 128 is made subsequently in the blade material by milling, grinding or other methods.

The elastomer layer 14 is for example cross-liked directly in the injection mould as an injection moulding compound on the all-metal main body 127 or made as a separate injection moulding and then bonded into the recess 128. Alternatively, it can for example be provided that the elastomer layer 14 is provided by a prefabricated pad vulcanized onto the recess 128. After application or fastening of the elastomer layer 14 in the recess 128 it can be provided that the elastomer layer 14 is milled over or ground over to provide the exactly required shape on the suction side of the blade 12.

Figure 4:
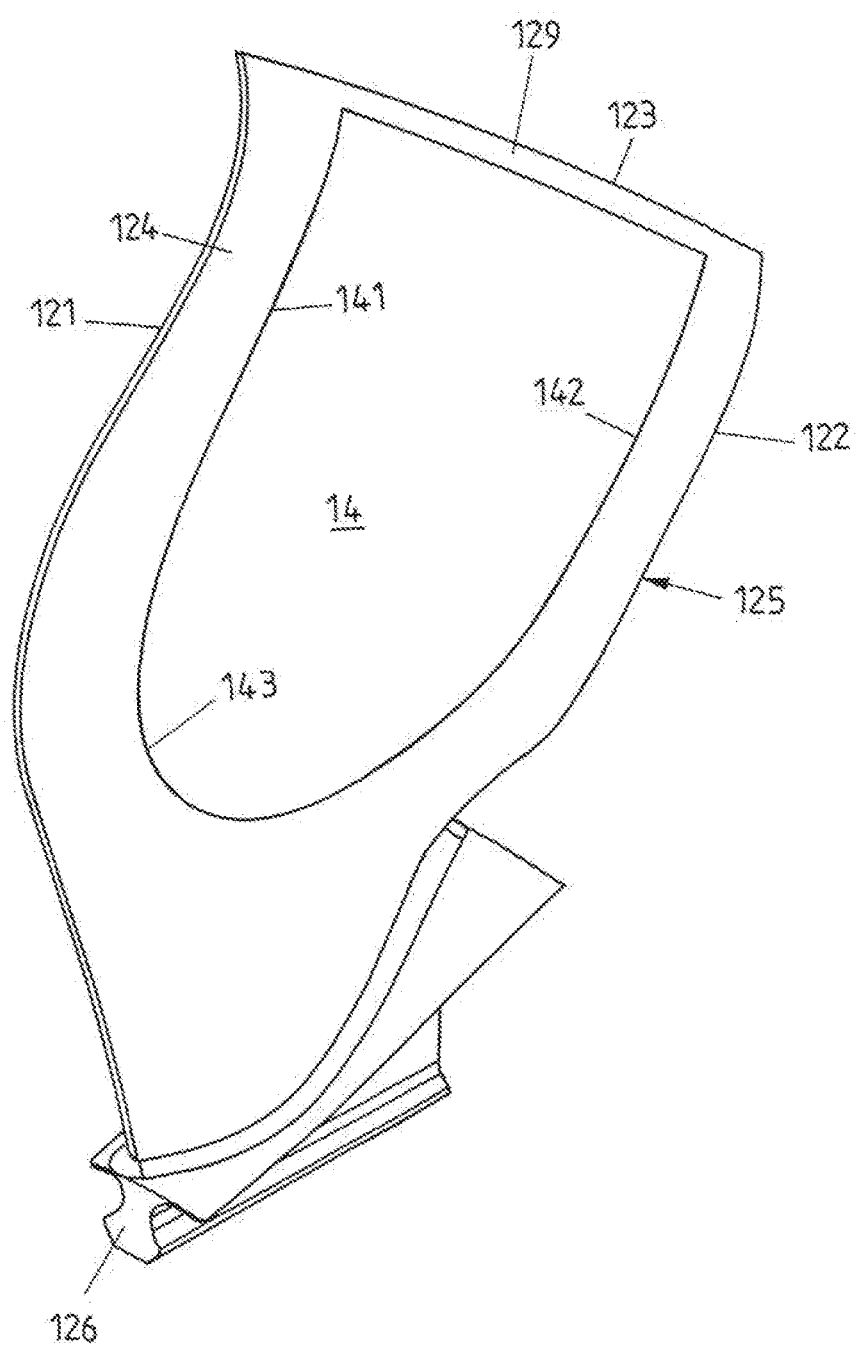
FIG. 4 shows a variant of the fan blade of FIG. 2, where the elastomer layer does not extend up to the blade tip.

FIG. 4 shows a variant of the blade in FIG. 2. The exemplary embodiment in FIG. 4 differs from the exemplary embodiment in FIG. 2 in that the elastomer layer 14 does not extend up to the blade tip 123, but a margin 129 remains between the blade tip 123 and the open end of the U-shaped elastomer layer 14. The width of this margin 129 can be for example between 5 mm and 5 cm.

Figure 5A:
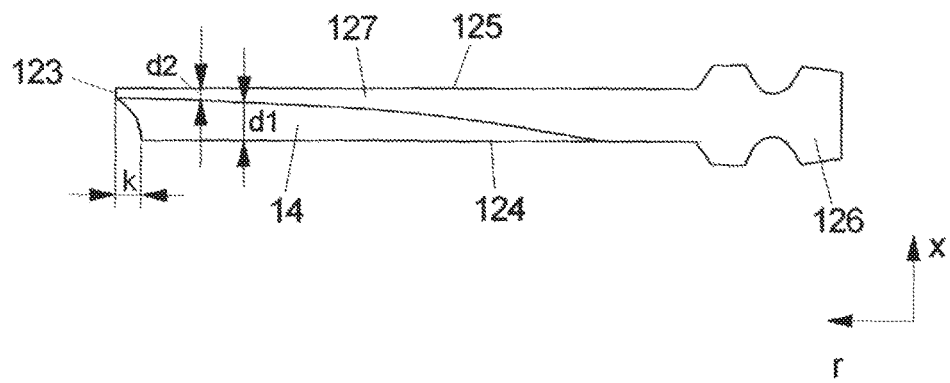
FIG. 5A shows a longitudinal section of a fan blade in accordance with FIG. 1 or 2.
Figure 5B:
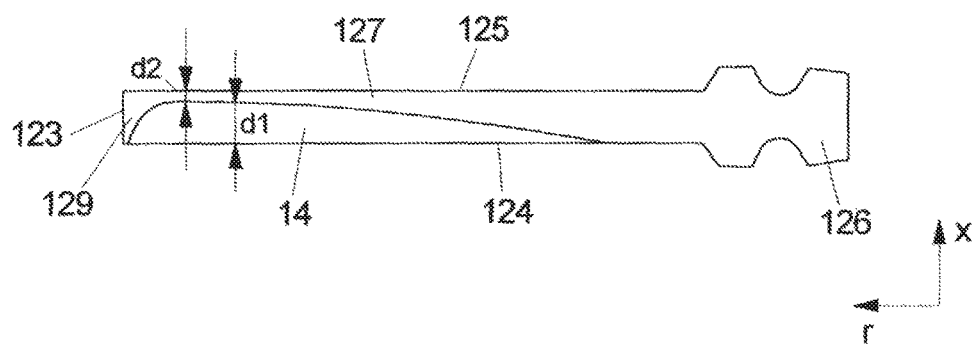
FIG. 5B shows a longitudinal section of a fan blade in accordance with FIG. 4.
Figure 8A:
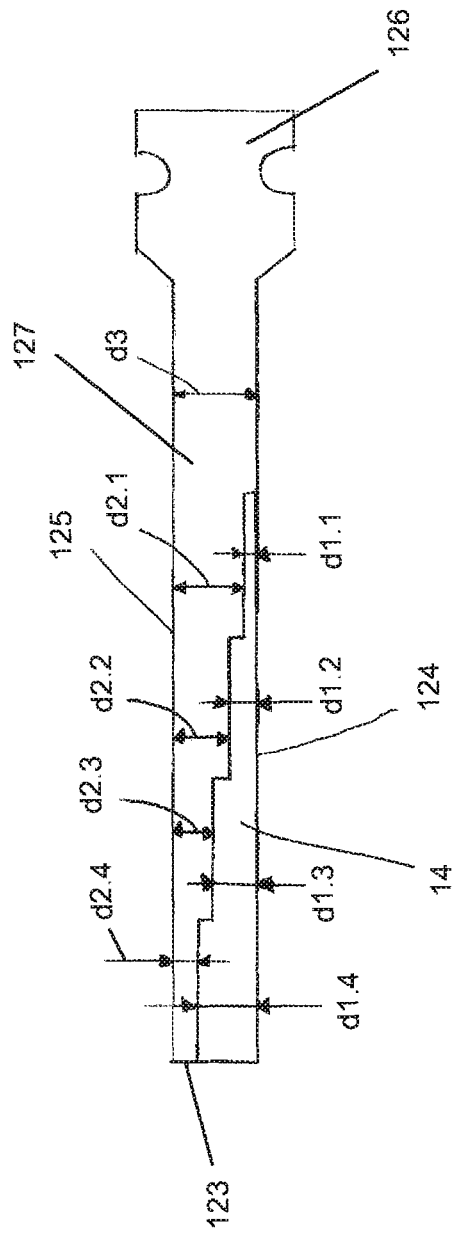
FIG. 8A shows a step by step increase/decrease with a step change in the thicknesses.
Figure 8B:
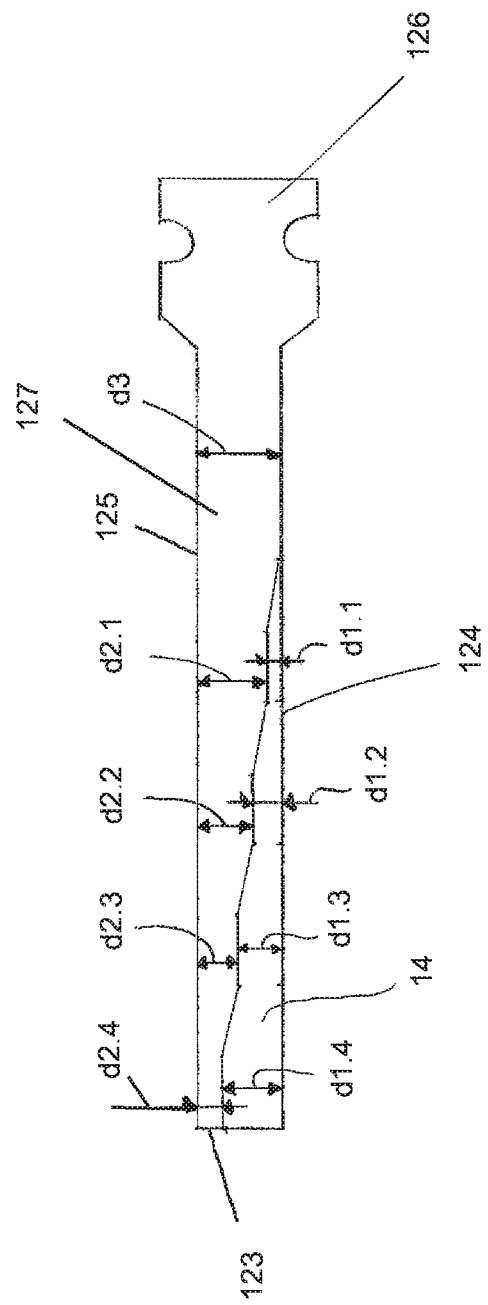
FIG. 8B shows a linear transition in thicknesses.
Figure 8C:
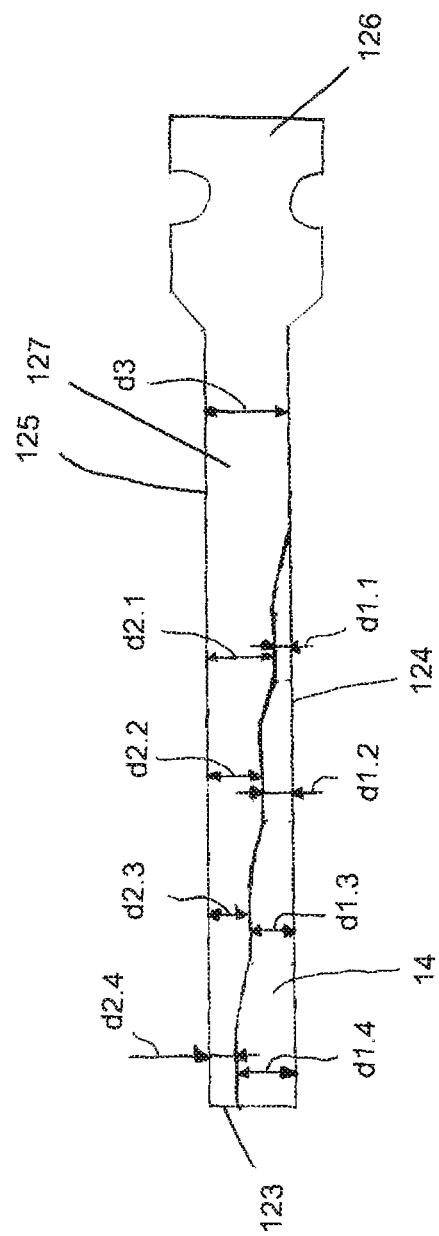
FIG. 8C shows a curved transition in thicknesses.

It is provided that the thickness of the elastomer layer 14 varies in the radial direction and/or in the axial direction. This applies for all exemplary embodiments of FIGS. 1 to 4. FIGS. 5A and 5B show the variation in the thickness d1 of the elastomer layer 14 in the longitudinal direction of the blade, i.e. in the radial direction r. FIG. 5A shows as an example a longitudinal section through the blade in FIGS. 1-3, and FIG. 5B shows as an example a longitudinal section through the blade in FIG. 4. Accordingly, in FIG. 5A the elastomer layer 14 extends up to the blade edge 123. In FIG. 5B, the margin 129 remains between the elastomer layer 14 and the blade edge 123. FIGS. 8A-8C each show a step by step (section by section) configuration discussed above, where FIG. 8A shows a step by step increase/decrease with a step change in the thicknesses; FIG. 8B shows a linear transition in thicknesses; and FIG. 8C shows a curved transition in thicknesses. Thicknesses d1.1-d1.4 represent different thicknesses of the elastomer layer 14 and thicknesses d2.1-d2.4 represent counterpart thicknesses of the main body 127.

It can be discerned that in both FIGS. 5A, 5B the thickness d1 of the elastomer layer 14 increases from a radially inner point (in the curved area 143) towards the blade tip 123, concomitantly with a thickness d2 constantly decreasing outwards of the metallic main body 127. The result of this is that with an increasing radius r the proportion of metal in the blade decreases and accordingly the weight of the blade is increasingly reduced towards the radially outer area of the blade. The steady increase in the thickness d1 of the elastomer layer 14 towards the blade tip 123 results here in a large-area transition in the stiffness of the blade in the radial direction r.

It is pointed out here that the remaining thickness d2 adjacent to the blade tip 123 of the metallic blade main body 127 is sufficient to provide the necessary blade strength.

It can further be discerned that in FIG. 5A the elastomer layer 14 tapers again over the radial distance k in its most radially outer end area, i.e. has over the distance k a thickness d1 decreasing towards the blade edge 123 without the thickness d2 of the blade main body 127 increasing at the same time. There is thus a shortening of the elastomer layer 14 at the edge side. This is however only an optional case.

In FIG. 5B a margin 129 remains between the elastomer layer 14 and the blade edge 123. In FIG. 5B too, the thickness d1 of the elastomer layer 14 reduces in its most radially outer end area, in this case with increasing thickness d2 of the blade main body 127. This too is only an optional case.

It can be provided that the thickness d1 of the elastomer layer 14 increases towards the blade tip 123 to up to 80% of the total thickness of the blade 12. If the blade for example has a thickness of 5 mm, the thickness of the elastomer layer 14 at the radially outer end of the elastomer layer can be up to 4 mm.

Figure 6:
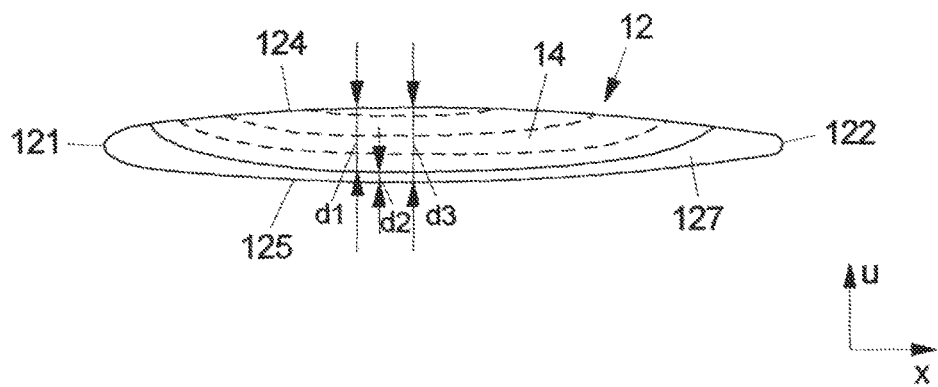
FIG. 6 shows a cross-section of a fan blade in accordance with FIG. 1 or 2.

FIG. 6 shows schematically a thickness distribution while illustrating a cross-section through a blade 12, i.e. a section in the axial direction x and in the circumferential direction u and vertically to the radial direction. It can be discerned here that the thickness d1 of the elastomer layer 14 decreases towards the leading edge 121 and the trailing edge 122. In the central area, the thickness d1 of the elastomer layer is highest and the thickness d2 of the blade main body 127 is only about 50% to 20%, preferably 20% of the total thickness d3 of the blade 12.

The dashed lines in FIG. 6 indicate the thickness d1 of the elastomer layer 14 in sections at other radial heights. In accordance with FIG. 5, the thickness of the elastomer layer 14 increases with the radial extent of the blade. FIG. 6 thus shows with its continuous line the thickness of the elastomer layer 14 close to the blade tip 123.

It is pointed out that a thickness distribution according to FIG. 5 can also be achieved in the axial direction x in a different way to that shown in FIG. 6. For example, it can be alternatively provided that the thickness d1 of the elastomer layer 14 in the axial direction x is substantially constant or is reduced only slightly at the transitions to the blade main body 127.

The invention in its design is not restricted to the above mentioned exemplary embodiments, which are only to be understood as examples. For instance, the shape of the elastomer layer 14 in FIGS. 1 to 4 must be understood only as an example. A large-area and contiguous elastomer layer can also be provided in many other shapes, for example circular, oval or rectangular. Furthermore, it is pointed out that the shape of the blade is only shown as an example, with the precise shape of the blade being immaterial for the present invention.

It is furthermore pointed out that the features of the individually described exemplary embodiments of the invention can be combined in various combinations with one another. Where areas are defined, they include all the values within these areas and all the sub-areas falling within an area.

The invention claimed is:

1. A fan blade for an aircraft engine, comprising:
   a main body, comprising:
   a leading edge,
   a trailing edge,
   a suction side,
   a pressure side, and
   a blade tip,
   a large-area elastomer layer applied to a surface of the suction side of the main body, the elastomer layer covering at least 20% of the surface of the suction side,
   wherein the elastomer layer has a thickness which increases in an outwardly radial direction at least in sections such that the thickness of the elastomer layer either increases continuously with an increasing radial height of the blade or remains constant after having increased to a certain thickness, with the increase in thickness of the elastomer layer occurring over more than half of a radial height of the surface of the suction side, and
   wherein the increasing thickness of the elastomer layer in the outwardly radial direction is accompanied by a decreasing thickness of the main body in the outwardly radial direction.

2. The fan blade in accordance with claim 1, wherein the elastomer layer covers a proportion of 20% to 80% of the surface of the suction side.

3. The fan blade in accordance with claim 1, wherein the elastomer layer is provided at a distance from at least one chosen from the leading edge and the trailing edge on the suction side.

4. The fan blade in accordance with claim 1, wherein the elastomer layer extends predominantly in an area of the fan blade that makes up a radially outer half of the surface of the suction side relative to an overall height of the surface of the suction side blade.

5. The fan blade in accordance with claim 1, wherein the elastomer layer extends up to the blade tip.

6. The fan blade in accordance with claim 1, wherein the elastomer layer ends at a distance from the blade tip.

7. The fan blade in accordance with claim 1, wherein the elastomer layer on the suction side forms a U-shaped area, where an open end of the U-shaped area ends at the blade tip or faces the blade tips.

8. The fan blade in accordance with claim 1, wherein the elastomer layer covers a proportion of a total thickness of the fan blade of up to 80%.

9. The fan blade in accordance with claim 1, wherein a thickness of the elastomer layer increases outwardly in a in the radial direction in a section by section manner.

10. The fan blade in accordance with claim 9, wherein the thickness of the elastomer layer increasing outwardly in the radial direction in a section by section manner, is concomitant with a thickness decreasing outwardly in a section by section manner of the main body.

11. The fan blade in accordance with claim 1, wherein a material of the fan blade has a large-area recess in an area not forming the elastomer layer, and the elastomer layer is applied to this large-area recess.

12. The fan blade in accordance with claim 11, wherein the main body is a one-piece metallic body.

13. The fan blade in accordance with claim 12, wherein the one-piece metallic body consists of a metal forging.

14. The fan blade in accordance with claim 1, wherein the elastomer layer consists of a fluorinated hydrocarbon.

15. The fan blade in accordance with claim 14, wherein the fluorinated hydrocarbon is a peroxide cross-linked copolymer.

16. The fan blade in accordance with claim 12, wherein the elastomer layer consists of a fluorinated hydrocarbon, wherein the fluorinated hydrocarbon is applied directly in an injection mold onto the large-area recess and cross-linked there to the one-piece metallic body.

17. The fan blade in accordance with claim 11, wherein the elastomer layer consists of a fluorinated hydrocarbon, and wherein the fluorinated hydrocarbon is vulcanized onto the large-area recess.

18. The fan blade in accordance with claim 1, wherein the elastomer layer has a Shore A hardness of at least 50.

19. A fan for a turbofan engine having a plurality of fan blades in accordance with claim 1.

20. The fan blade in accordance with claim 1, wherein the main body is a composite structure including carbon fibers.

21. The fan blade in accordance with claim 1, wherein the fan blade is part of BLISK.

* * * * *